(12) United States Patent
Powell

(10) Patent No.: US 8,098,135 B2
(45) Date of Patent: Jan. 17, 2012

(54) COORDINATION OF RADIO FREQUENCY COMMUNICATIONS AMONGST RADIO FREQUENCY IDENTIFICATION (RFID) READERS

(75) Inventor: Kevin J. Powell, Annapolis, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 1113 days.

(21) Appl. No.: 11/927,057

(22) Filed: Oct. 29, 2007

(65) Prior Publication Data
US 2008/0100447 A1 May 1, 2008

Related U.S. Application Data

(60) Provisional application No. 60/854,689, filed on Oct. 27, 2006.

(51) Int. Cl.
*H04Q 5/22* (2006.01)
(52) U.S. Cl. .................................................... 340/10.2
(58) Field of Classification Search ................. 340/10.2
See application file for complete search history.

(56) References Cited

U.S. PATENT DOCUMENTS

| 5,751,220 A * | 5/1998 | Ghaffari ................. 340/12.31 |
| 2006/0022801 A1 * | 2/2006 | Husak et al. ................. 340/10.5 |

\* cited by examiner

*Primary Examiner* — Brian Zimmerman
*Assistant Examiner* — Sara Samson
(74) *Attorney, Agent, or Firm* — Glenn Frankenberger; Terri Hughes Smith

(57) ABSTRACT

Methods and apparatuses are described for reducing interference amongst frequency identification (RFID) readers operating within an interference range. Groups of frequencies from a range of frequencies are determined such that RFID readers transmitting on adjacent frequencies in a particular group of frequencies experience substantially negligible interference. A first group of frequencies is selected for a first time period of operation. RFID readers are each assigned a unique frequency from the first group of frequencies. At the end of the first time period, a second group of frequencies is selected and RFID readers are each assigned unique frequencies from the second group of frequencies. Substantially all frequencies of the groups of frequencies are assigned during a predetermined time duration.

25 Claims, 7 Drawing Sheets

COORDINATION OF RADIO FREQUENCY COMMUNICATIONS AMONGST RADIO FREQUENCY IDENTIFICATION (RFID) READERS

CROSS-REFERENCE TO RELATED APPLICATION

This application claims the benefit of U.S. Provisional Application No. 60/854,689 filed Oct. 27, 2006, which is incorporated herein by reference.

FIELD OF THE INVENTION

The present invention generally relates to radio frequency identification (RFID) communications, and more specifically relates to communications by RFID readers.

BACKGROUND ART

Radio frequency identification (RFID) tags are electronic devices that may be affixed to items whose presence is to be detected and/or monitored. The presence of an RFID tag, and therefore the presence of the item to which the tag is affixed, may be checked and monitored by devices known as "readers." Readers typically transmit radio frequency signals to which the tags respond. Each tag can store a unique identification number. The tags respond to the reader transmitted read signals by providing their identification number, so that they can be identified.

Readers may interfere with each other when attempting to communicate with tags. Interference in RFID reader communications is largely due to an RFID reader operating on the same or proximate frequency ("channel") as another RFID reader, where the RFID readers are also within an interference range. The interference range may be measured in miles, depending upon the power output of the readers. Interference between RFID readers operating on proximate frequencies and within the interference distance is caused primarily due to a typically large power output associated with RFID readers. Uncoordinated frequency utilization can result in a large amount of interference amongst readers, thereby causing data transmitted by tags to be lost. Lost data requires RFID readers to re-interrogate tags, thereby decreasing throughput. As the number of active RFID readers within the interference range approaches the available number of channels, the amount of interference increases. Due to the increase in interference, the frequency of necessary RFID reader re-transmissions increases, thereby delaying reader throughput.

Therefore, what is needed is a method and system to reduce interference amongst RFID readers when communicating with tags.

BRIEF SUMMARY OF THE INVENTION

Embodiments of the present invention provide methods, systems and apparatuses for reducing interference amongst RFID readers that are communicating with tags within an interference range.

In accordance with an embodiment of the present invention frequencies are selected and assigned to RFID readers. Groups of frequencies from a range of frequencies are determined such that RFID readers transmitting on adjacent frequencies in the group of frequencies experience substantially negligible interference. A first group of frequencies is selected for a first time period of operation. RFID readers are each assigned unique frequencies from the first group of frequencies. At the end of the first time period, a second group of frequencies is selected and RFID readers are assigned unique frequencies from the second group of frequencies. Substantially all frequencies of the groups of frequencies are assigned during a predetermined time duration.

In accordance with another embodiment of the present invention, a RFID reader is described. The RFID reader includes a RFID controller, a transceiver coupled to the RFID controller and at least one RF antenna coupled to the transceiver. The RF antenna transmits commands received from the RFID controller via the transceiver, and receives responses from a population of RFID tags in an environment. In a master mode, the RFID controller is configured to select and assign frequencies to slave readers. The RFID selects groups of frequencies and assigns unique frequencies from the selected group to slave readers for a predetermined time period. The frequencies assigned by the controller are such that readers operating on adjacent frequencies experience substantially negligible interference. The RFID controller selects another group and assigns frequencies from the other group to slave readers at the end of the predetermined time period. The RFID controller assigns substantially all frequencies from the groups of frequencies within a predetermined time duration. Adjacent frequencies within a group of frequencies are such that readers within an interference range and operating on adjacent frequencies experience substantially negligible interference.

These and other advantages and features will become readily apparent in view of the following detailed description of the invention. Note that the Summary and Abstract sections may set forth one or more, but not all exemplary embodiments of the present invention as contemplated by the inventor.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers indicate identical or functionally similar ele-

DETAILED DESCRIPTION OF THE INVENTION

Introduction

The present invention relates to reducing interference amongst radio frequency identification (RFID) readers communicating within an interference range. Readers within an interference range and operating on adjacent frequencies in a group experience substantially negligible interference. As is described in more detail herein, in accordance with an embodiment of the present invention, groups of frequencies are selected from a range of frequencies. Readers are each assigned unique frequencies from a first group of frequencies for a first time period. At the end of the first time period, readers are each assigned unique frequencies from a second group of frequencies for a second time period. Readers are each assigned substantially all frequencies from the groups of frequencies with a predetermined time duration.

Although embodiments of the invention are directed towards RFID readers, it is in no way limited these. For example embodiments of the invention are applicable to other communications devices that need to avoid interference.

Example ways of reducing interference amongst RFID readers by coordinating frequencies on a predetermined time basis are provided below for purposes of illustration, and are not intended to be limiting. Further ways of reducing interference by frequency coordination on a predetermined time basis may become apparent to persons skilled in the relevant art(s) from the teachings herein. Such embodiments are also within the scope and spirit of the present invention. Embodiments of the invention may be performed in hardware, software, firmware or any combination thereof.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Example RFID Tag Environment

Figure 1:
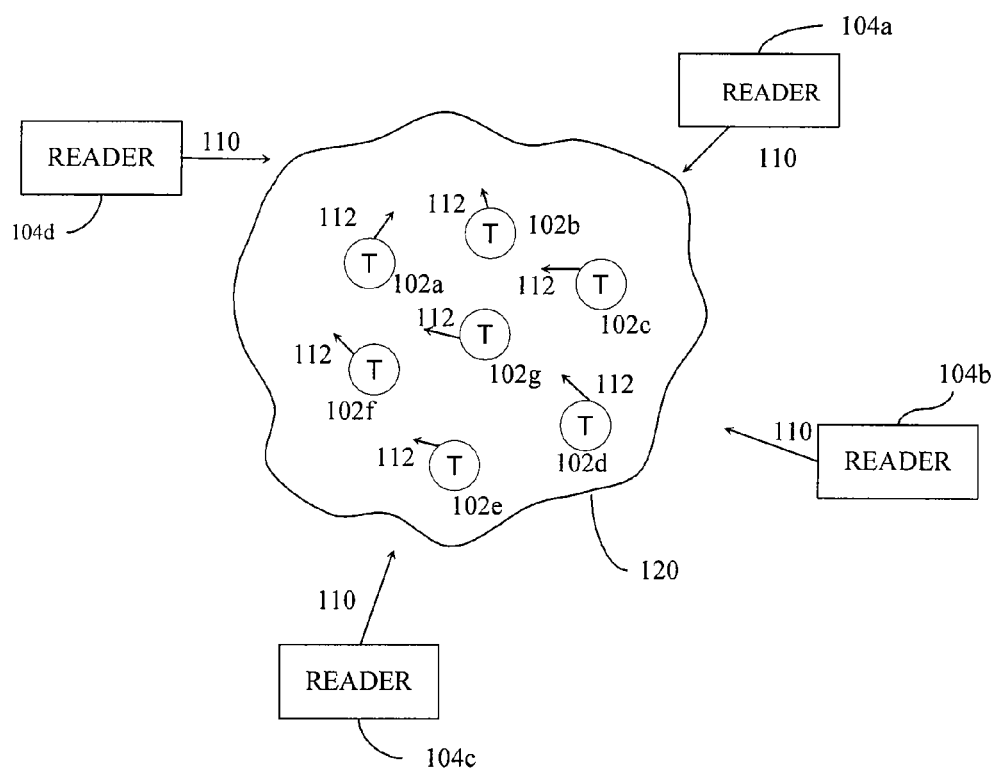
FIG. 1 illustrates an environment where RFID readers communicate with an exemplary population of RFID tags in accordance with an embodiment of the present invention.

Before describing embodiments of the present invention in detail, it is helpful to describe an example environment in which embodiments of the present invention may be implemented. FIG. 1 illustrates an environment 100 where RFID tag readers 104 communicate with an exemplary population 120 of RFID tags 102. As shown in FIG. 1, the population 120 of tags includes seven tags 102a-102g. According to embodiments of the present invention, a population 120 may include any number of tags 102. In some embodiments, a very large number of tags 102 (e.g., hundreds, thousands, or even more) may be included in a population 120 of tags.

Environment 100 also includes readers 104a-104d. Readers 104 may operate independently or may be coupled together to form a reader network. A reader 104 may be requested by an external application to address the population of tags 120. Alternatively, reader 104 may have internal logic that initiates communication, or may have a trigger mechanism that an operator of reader 104 uses to initiate communication.

As shown in FIG. 1, a reader 104 transmits an interrogation signal 110 having a carrier frequency to the population of tags 120. The reader 104 operates in one or more of the frequency bands allotted for this type of RF communication. Various types of tags 102 transmit one or more response signals 112 to an interrogating reader 104 in a variety of ways, including by alternatively reflecting and absorbing portions of signal 110 according to a time-based pattern or frequency. This technique for alternatively absorbing and reflecting signal 110 is referred to herein as "backscatter modulation" or "tag backscatter". Reader 104 receives response signals 112, and obtains data from response signals 112, such as an identification number of the responding tag 102.

Frequency bands of 902-928 MHz and 2400-2483.5 MHz have been defined for certain RFID applications by the Federal Communication Commission (FCC). Furthermore, due to regulatory or operational considerations, reader 104 must change carrier frequency on a periodic basis (e.g., ranging from 50 to 400 milliseconds) within the operational band. In these "frequency hopping" systems, the operational band is divided into a plurality of channels. For example, the 902-928 MHz frequency band may be evenly divided into 25 to 50 channels, depending upon the maximum bandwidth defined for each channel. The maximum allowable bandwidth for each channel may be set by local or national regulations. For example, according to FCC Part 15, the maximum allowed bandwidth of a channel in the 902-928 MHz band is 500 kHz. Each channel is approximately centered around a specific frequency, referred to herein as the hopping frequency. In uncoordinated frequency utilization, a frequency hopping reader changes frequencies by hopping frequencies according to a pseudorandom sequence. Each reader 104 typically uses its own pseudorandom sequence. Thus, at any one time, one reader 104a may or may not be using a different carrier frequency than another reader 104b, thereby increasing the potential for interference.

Frequency coordination for RFID readers is limited due to regulatory requirements such as those specified by the FCC, which prohibit specific frequency coordination amongst RFID readers. Interference in RFID reader communications is largely due to an RFID reader transmitter operating on the same or proximate frequency ("channel") as another RFID reader's receiver, where the RFID readers are also within a communications interference range. An interference range, as described herein, is the maximum physical distance between two readers such that a first reader's transmitter signal interferes with a second reader's receiver attempting to receive communications from a tag. The interference range may be in miles depending upon the power output of the particular reader in combination with the anticipated receive signal from a tag. Systems with long distance tag operations are typically required to both transmit at a higher power and receive at a lower power than do systems communicating with lesser distance tags of the same response characteristics, thereby making interference issues substantially worse on slightly longer distance operations. Interference between RFID readers operating on proximate frequencies and within an interference distance is caused primarily due to a typically large power output associated with RFID readers. RFID readers experience interference over a large bandwidth when an RFID transmitter is turned on. A dynamic range of power (e.g., up to 100 dB) typically exists between RFID readers and expected passive RFID backscattered signals from RFID tags, however future improvements on technology is expected to increase this dynamic range. The amount of interference declines with general attenuation due to distance or RF attenuating materials such as walls and concrete floors, and other obstacles. If an RFID reader is in an outside environment where RF attenuating materials are sparse, the sphere of influence of an RFID reader with uncoordinated frequency utilization can be many miles. Even in an interior office space, interfering transmission can be provided by RFID readers located in an adjacent building.

Some RFID protocols employ tag backscatter signals configured to substantially widen the frequency between an RFID reader and tag response so that the tag response frequencies are outside the transmitter channel. However, these protocols do not include a mechanism to coordinate usage of frequencies in an RFID reader network, in a specific frequency range and relative to powering location to avoid a reader unknowingly transmitting a carrier in the other reader's configured receiver frequency range.

Interferences amongst readers causes data received from tags to be lost. Lost data requires RFID readers to re-interrogate tags thereby decreasing throughput. As the number of active RFID readers within interference range gets close to the available number of channels, interference increases substantially. Due to the increase in interference, the frequency of RFID re-transmissions must be increased thereby delaying overall throughput.

Figure 2A:
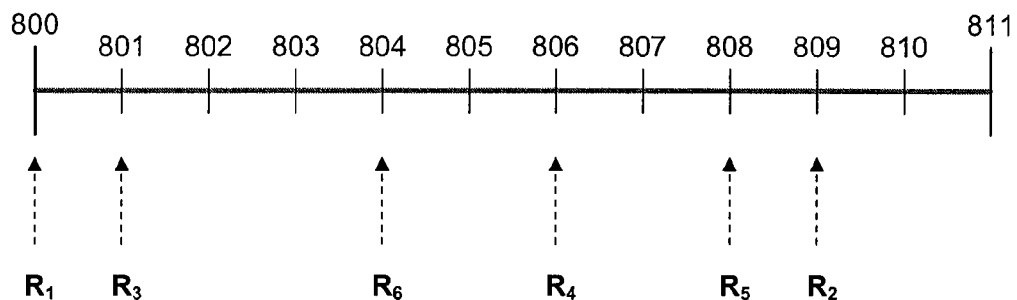
FIG. 2A illustrates uncoordinated frequency utilization by RFID readers.

FIG. 2A illustrates readers communicating at various frequencies in an uncoordinated fashion. In this example, the communication frequency bands range from 800 Mhz to 811 Mhz. Six RFID readers R1 to R6 operate between 800 Mhz and 811 Mhz, each with a 1 Mhz tag backscatter subcarrier frequency. Readers R1 to R6 are located within an interference range. Readers R1 and R3 transmit at 800 Mhz and 801 Mhz respectively with a 1 Mhz separation in frequency. Readers R6 and R4 transmit at 804 Mhz and 806 Mhz respectively with a 2 Mhz separation in frequency. Readers R5 and R2 transmit at 808 Mhz and 809 Mhz respectively with a 1 Mhz separation between transmitting frequencies. In this example, readers R4 and R6 have a 2 Mhz separation between their transmitting frequencies and thus do not experience interference with respect to their own signals while using a 1 Mhz tag backscatter subcarrier. In contrast, since readers R1 and R3 have a 1 Mhz separation between transmitting frequencies and use a 1 MHz backscatter subcarrier, they will experience significant interference, requiring frequent re-transmissions to re-interrogate tags. These re-transmissions will decrease throughput for readers R1 and R3. Similarly, readers R5 and R2 will also experience significant interference because of the close proximity of their transmitting frequencies.

Example Embodiments

In embodiments of the invention, a coordinated frequency utilization plan is described that allows individual devices to select or be assigned particular frequencies. The coordinated frequency utilization plan is coordinated on a non-granular time basis. The time basis can be flexible enough so as to allow for randomness required by various local regulations. The coordination plan may utilize various ways of communicating between readers, including reader network connections (802.3, 802.11, RS485, etc), RFID reader transmissions (either imbedded into RFID tag transmissions, or discretely separate transmissions), or a combination of the above.

In an embodiment, the coordinated frequency utilization includes groupings of frequencies from a range of frequencies. Frequencies in a group are chosen such that an RFID reader transmission on any of the frequencies in the group will not result in interference with an RFID reader operating over any adjacent frequency in the same group. The separation between adjacent frequencies in a group is based on the selection of tag backscatter subcarrier, which depending upon a selected protocol may be either configurable by a reader or static. For example, in the case of backscatter subcarrier at 1 Mhz, if a first frequency of a first grouping is selected at 804 Mhz, then the potential for interference is very large at 805 MHz or 803 MHz since these are exactly the frequencies that will contain backscatter data (as is explained in the EPC Gen2 standard, appendix G). Thus, both of 803 Mhz and 805 Mhz are channels that are not selected for the first group of frequencies. However, 802 Mhz and 806 Mhz can be included in the first group of frequencies because they provide a 2 Mhz separation from the 804 Mhz frequency. In an example, groupings of even and odd channels form two groups which minimize interference.

Local regulation, such as regulations specified by the FCC in the United States, do not allow frequencies to be coordinated except for the purpose of reducing interference. Furthermore, these regulations stipulate that frequencies in a predetermined range should be utilized in a manner which evenly distributes power the frequencies over a period of time (for example, 20 seconds). Choosing to operate in a first group of a range of RFID frequencies does not abide by FCC regulations, since frequencies in the range outside the first grouping would not be utilized. Furthermore, allowing transmitters to randomly operate on any frequency or in any grouping may cause a RFID reader to operate on another RFID reader's receiver frequency which would cause severe interference conditions.

To satisfy local regulations, embodiments of the present invention coordinates on a relatively non-granular time basis (e.g. once every 10 seconds) the operation of readers under multiple groups of frequencies (e.g. a first group of even channels and a second group of odd channels). Thus all frequencies are utilized in a predetermined time duration (e.g. all even and odd frequencies may be utilized in 20 seconds).

Figure 2B:
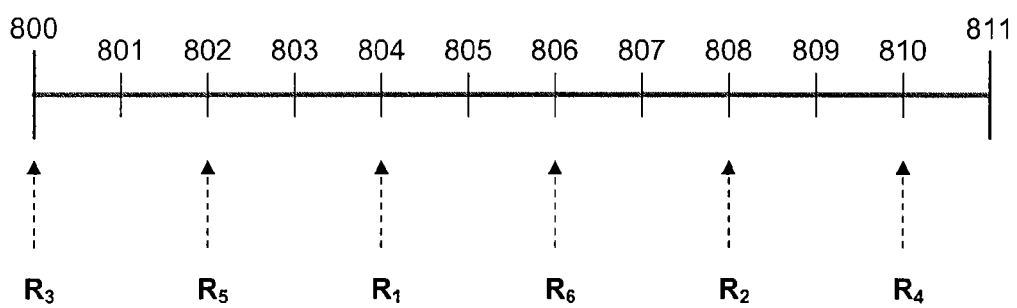
FIGS. 2B-2C illustrate coordinated frequency utilization by RFID readers according to an embodiment of the invention.
Figure 2C:
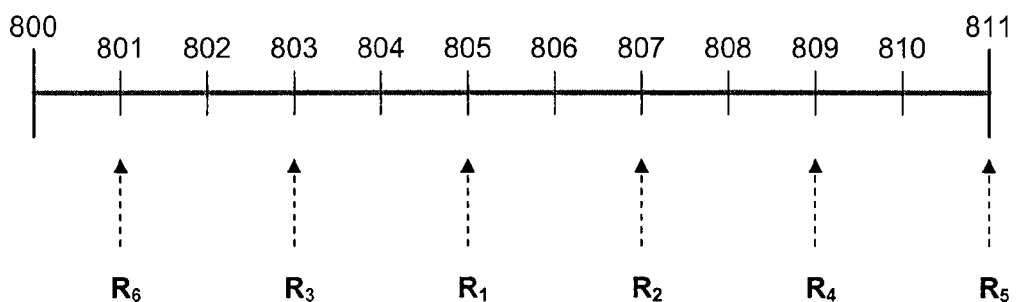

FIGS. 2B and 2C illustrate coordinated frequency utilization amongst RFID readers according to an embodiment of the invention. In FIG. 2B, readers R1 through R6 are each assigned unique frequencies in a first group. In this example, the first group comprises even frequencies such as 800 Mhz, 802 Mhz, 804 Mhz, 806 Mhz, 808 Mhz and 810 Mhz. Since adjacent frequencies are separated by 2 MHz, there is substantially no interference when using a tag backscatter subcarrier of 1 MHz. For a predetermined time period (e.g. 10 seconds) or a specific reference to a coordinated clock, readers R1 to R6 transmit on frequencies assigned from the first group. At the end of the predetermined time period, readers R1 through R6 transmit on frequencies present in a second group of frequencies.

FIG. 2C illustrates readers R1 through R6 having been assigned to frequencies in a second group. As seen in FIG. 2C, readers R1 through R6 are each assigned unique transmission frequencies from a second group. In this example, the second group comprises odd frequencies, such as 801 Mhz, 803 Mhz, 805 Mhz, 807 Mhz, 809 Mhz and 811 Mhz. Since adjacent frequencies are separated by 2 MHz, there is substantially no interference when using a tag backscatter subcarrier of 1 MHz. For a predetermined time period (e.g. 10 seconds), readers R1 to R6 transmit on frequencies assigned from the second group. The predetermined time period may be the same or different from the time period used for the first group. The degree of separation between frequencies within a group may be varied depending upon the transmission power of RFID readers and the tag backscatter subcarrier in use. Furthermore, the time period during which frequencies from a group are utilized may also be varied according to implementation and local regulations regarding frequency utilization.

Figure 3:
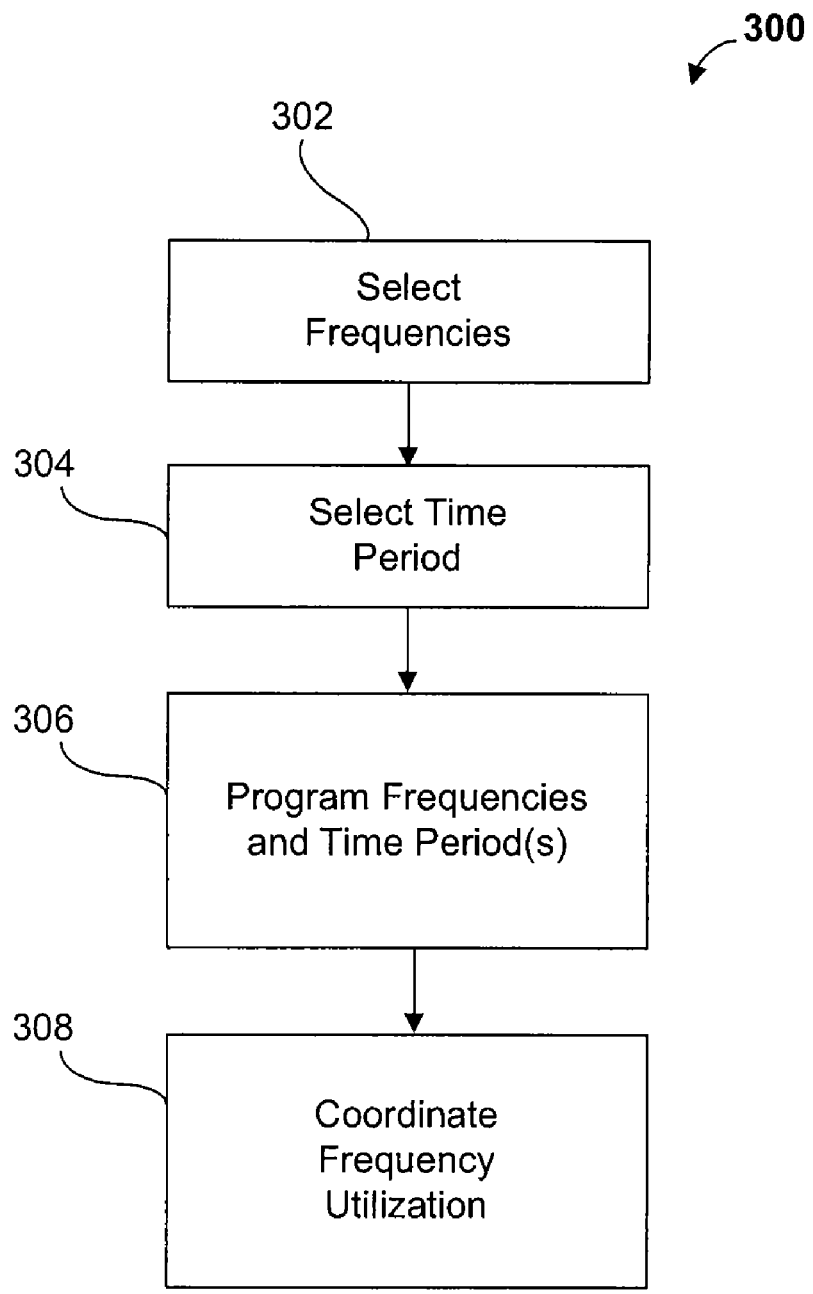
FIG. 3 illustrates an example flowchart showing steps to coordinate frequency utilization amongst RFID readers according to an embodiment of the invention.

FIG. 3 illustrates an example flowchart 300 showing steps to coordinate frequency utilization amongst RFID readers according to an embodiment of the invention. Part or all of the steps in flowchart 300 may be implemented by a centralized controller which controls RFID readers in an environment. The steps in flowchart 300 may also be implemented by an RFID reader in master mode ("master reader") and/or RFID readers in slave mode ("slave reader"). An RFID reader operating in master mode typically directs the operation of RFID readers in slave mode. Furthermore, the coordination may also be predefined and programmed into operational readers directed for coordination based upon a central clocking mechanism. The steps in flowchart 300 may be implemented in hardware, software, firmware or any combination thereof.

In step 300, groups of frequencies are determined from a given range of frequencies. For example, an even group of frequencies and an odd group of frequencies may be selected from a frequency range of, for example, 800 Mhz to 811 Mhz. In embodiments, more than two groups may be designated. In an embodiment, 3 groups of frequencies may be selected where each group includes one frequency from every third frequency in a range of frequencies. In another embodiment, 4 groups of frequencies maybe selected where each group includes one frequency from every fourth frequency in a range of frequencies. The advantage to wider frequency spacing in groups is that transmitters are farther removed from receivers affording either a wider bandwidth receive signal (typically affording a higher data rate) or a closer range between operational readers. Alternatively, 3 or more subgroups may be formed from a larger group of frequencies to avoid any interference in various modes, such as on small time synchronization variances, for instance when switching groups, due to network latency, time fade, or periodic lack of time synchronization do not guarantee extremely accurate time coordination between a 2 group implementation. In another example, when selecting frequencies from a range of frequencies, a lower half of even frequencies may be designated for a first group, the upper half of even frequencies for a second group, the lower half of odd frequencies for a third group, and the upper half of odd frequencies for a fourth group. Similarly, more groups of frequencies with different combinations of frequencies may be selected.

In step 304, a time period to switch groups in a given time duration is selected. The time duration may be based on implementation and local regulations regarding frequency utilization. In an example, regulations may require power to be evenly distributed amongst frequencies in a range in a 20 second time duration. If two groups of frequencies are used, then frequencies in each group may be utilized, for example, for a 10 second time period each. In a first 10 second time period, frequencies in the first group are utilized. At the end of the second time period, the frequencies in the second group are utilized for 10 seconds, and then switched back to the first group, and so on. Thus in 20 seconds, power is evenly distributed amongst frequencies in a given range. In embodiments, the time period assigned to frequency groups may be uneven. For example, in a 20 second time duration, the first group may be utilized for a time period of 8 seconds and the second group may be utilized for a time period of 12 seconds. The time periods may also be changed dynamically as required. If a time duration is not specified by local regulations, an arbitrary time duration may be selected as it may be more appropriate and efficient for the reader to remain within an active group for a longer period of time to complete a series of un-interrupted communications with respective tags. Time synchronization issues even on the order of several seconds will not adversely impact the overall level of reduced interference.

In step 306, the groups of frequencies and time periods to switch frequencies is programmed, pre-programmed or transmitted to one or more devices controlling operation of RFID readers. For example, a centralized network controller may be programmed with frequency groups and time periods to coordinate frequency utilization for all RFID readers under its influence. In another example, an RFID reader operating in master mode is programmed with frequency groups and time periods. In yet another example, slave RFID readers are programmed with the frequency groups and time periods. Finally, in a very simplistic example, RFID readers are pre-programmed with static groups of frequencies and merely synchronize to a centralized time source.

In step 308, during operation, frequency utilization is coordinated on a predetermined time period basis. The RFID reader(s) and/or centralized controller synchronize readers within a network and with a time source, such as a network clock or an atomic clock. The readers operate on frequencies from a given group of frequencies for a predetermined time period before changing to another group of frequencies.

Figure 4:
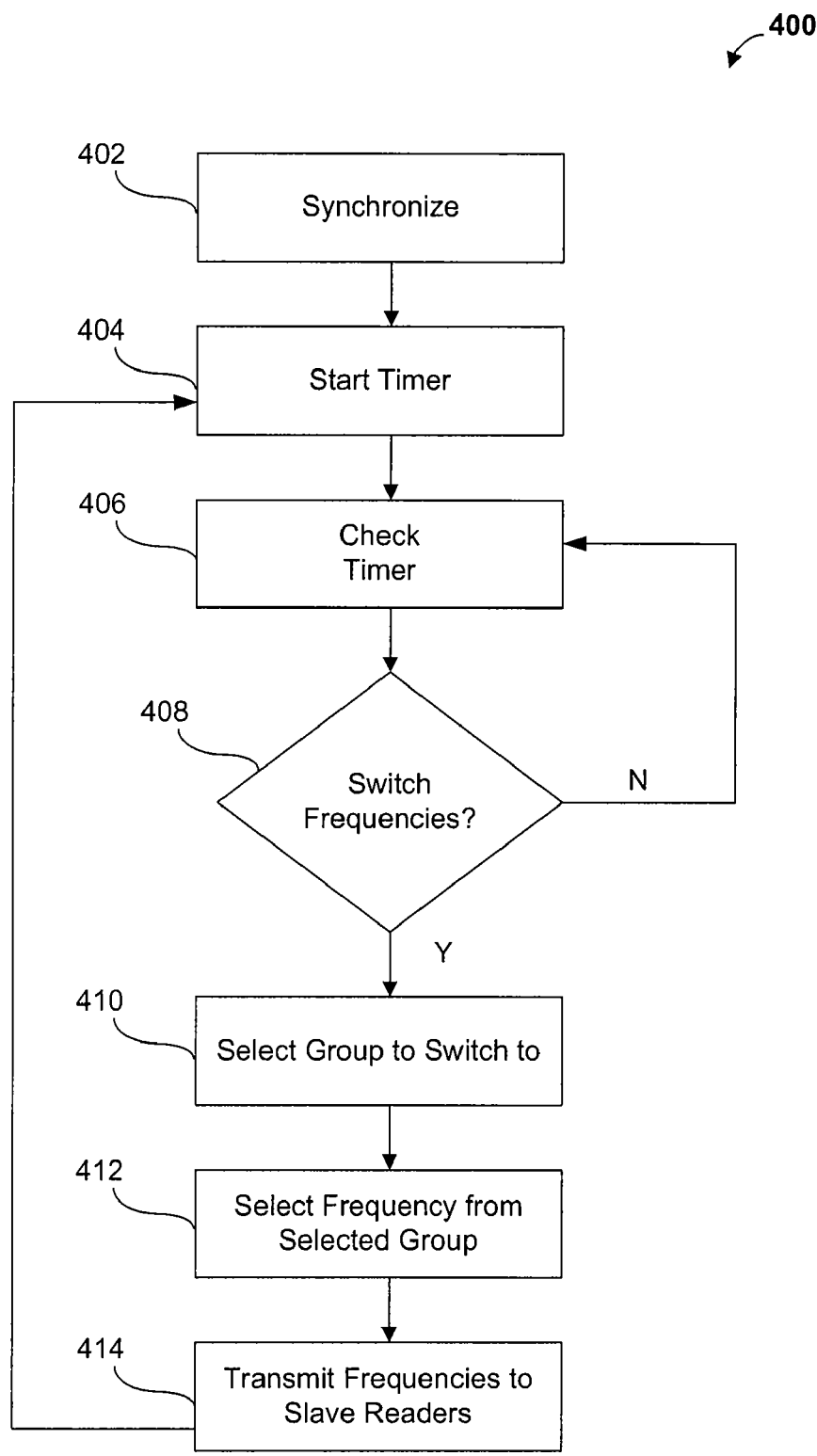
FIG. 4 illustrates an example flowchart showing steps performed by an RFID reader operating in a master mode according to an embodiment of the invention.

FIG. 4 illustrates an example flowchart showing steps performed by an RFID reader operating in master mode according to an embodiment of the invention. A master reader directs the operation of slave readers under its influence. There may be one or more master readers with distinct groups of master readers under their individual control. The steps in flowchart 400 may be implemented in hardware, software, firmware or any combination thereof.

In step 402, a master reader synchronizes time with a time source and also synchronizes slave readers under its influence. The time synchronization can rely upon numerous existing time synchronization methods such as an atomic clock, web based time servers and existing wireless or other network timing systems. The time synchronization may also be implemented with a local clocking mechanism in a master reader. The time synchronization may occur prior to a tag interrogation session or on a predetermined schedule at regular intervals to afford a simple local time source but still with minimal drift. The master reader may synchronize with a slave RFID reader by transmitting a signal to indicate that the slave reader's frequency utilization will be coordinated by the master reader. In an environment with multiple master readers and distinct groups of slave readers, each master reader synchronizes with its slave readers.

In step 404, the master reader starts a timer. The timer is used to maintain track of a time period during which a group of frequencies is utilized. During startup, the master reader also selects an initial group of frequencies and assigns them to slave readers. The master reader may also assign itself a frequency including the slave readers.

In step 406, the master reader checks the timer started in step 404, to determine the amount of time spent operating in a given group of frequencies.

In step 408, the master reader determines whether the current frequency group is to be switched based on the time period measured in step 406. The time period measured in step 406 is compared to a predetermined time period for the particular frequency group in current use. If it is determined that the time period for the current frequency group has not expired, control returns to step 406.

In step 410, if it is determined in step 408 that the time period for the current frequency group has expired, the next group of frequencies is selected. The next group of frequencies to operate in may be selected randomly or in a predetermined order. For example, frequency groups may be changed from a group of odd frequencies to a group of even frequencies.

In step 412, the master reader selects for each slave reader under its control a unique frequency of operation from the group of frequencies selected in step 410. In an embodiment, if the master reader is cognizant of the relative location of slave readers, it may select frequencies within the group, based on interference range, so as to further decrease interference between slave readers. For example, if a slave reader is relatively close to another slave reader, the master reader may assign the adjacent readers frequencies that are spaced further apart to minimize interference. In an embodiment, the master reader may also select a frequency of operation for itself from the group of frequencies selected in step 410.

In step 414, the master reader transmits and assigns frequencies selected in step 412 to slave readers under its control. In an embodiment, the master reader may also assign itself a frequency of operation selected in step 412. After assigning frequencies, control returns to step 404 where the master reader restarts the timer.

Figure 5:
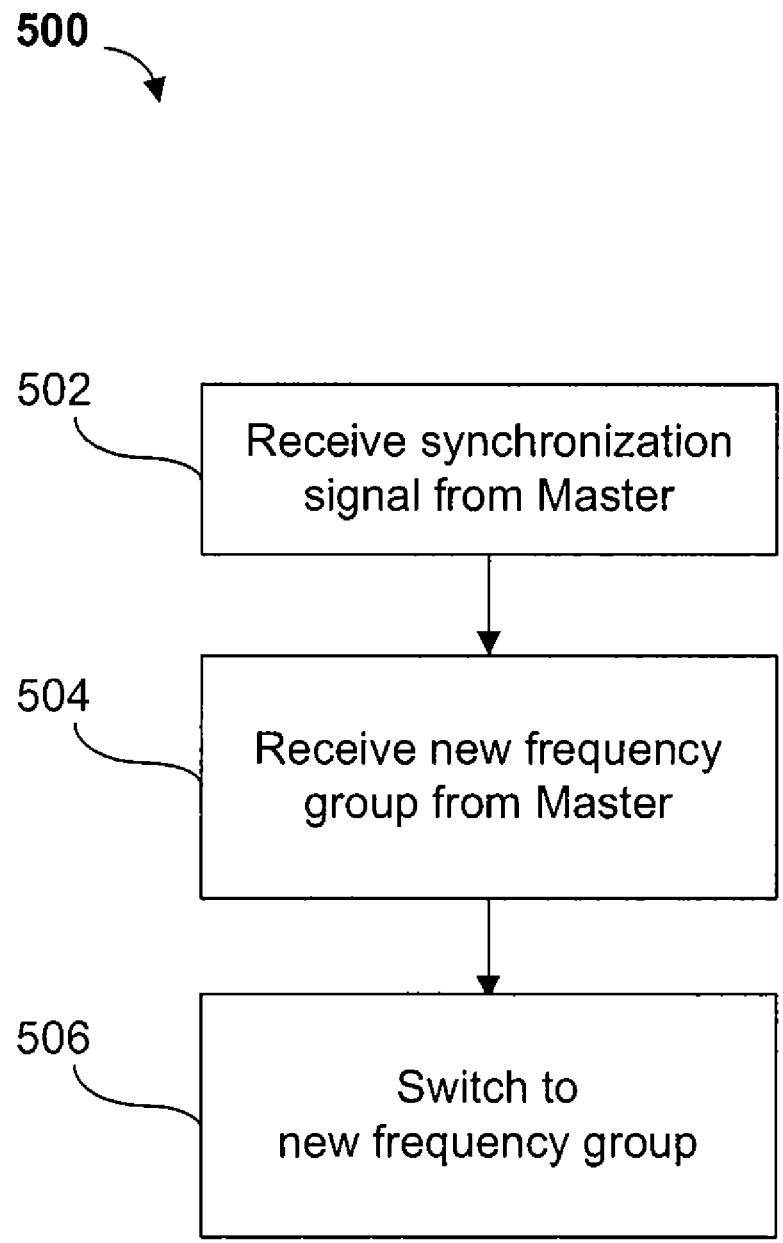
FIG. 5 illustrates an example flowchart showing steps performed by an RFID reader operating in a slave mode according to an embodiment of the invention.

FIG. 5 illustrates an example flowchart showing steps performed by an RFID reader operating in slave mode according to an embodiment of the invention. A slave reader's frequency utilization is coordinated by a master reader. There may be one more master readers with distinct groups of slave readers under control of distinct master readers. The steps in flowchart 500 may be implemented in hardware, software, firmware or any combination thereof.

In step 502, a slave reader receives a synchronization signal directly from a master reader or indirectly from another time base authorized in advance by the master reader. The synchronization signal indicates the master reader and that slave readers will be controlled in frequency utilization. In an RFID environment with multiple master readers, the synchronization signal helps identify the master reader that will coordinate frequency utilization of a slave reader. In an embodiment, a slave reader receives a synchronization signal from a network controller, for example in a broadcast message to all readers.

In step 504, a slave reader receives a transmission indicating the group of frequencies that it should operate on. This step is not required in the embodiment where static pre-programmed groups of frequencies are programmed into readers in a particular implementation and operational location.

In step 506, the slave reader switches from its current group of frequencies of operation to the new group of frequencies indicated by the transmission received in step 504.

In the steps shown in flowcharts 400 and 500, the use of a master reader with passive slave readers requires only the master reader to be programmed with groups of frequencies, keep track of a timer, select groups of frequencies and select frequencies within a selected group. Thus most of the overhead is handled by a master reader. In another embodiment, a network controller may direct the frequency utilization of multiple groups of readers.

Figure 6:
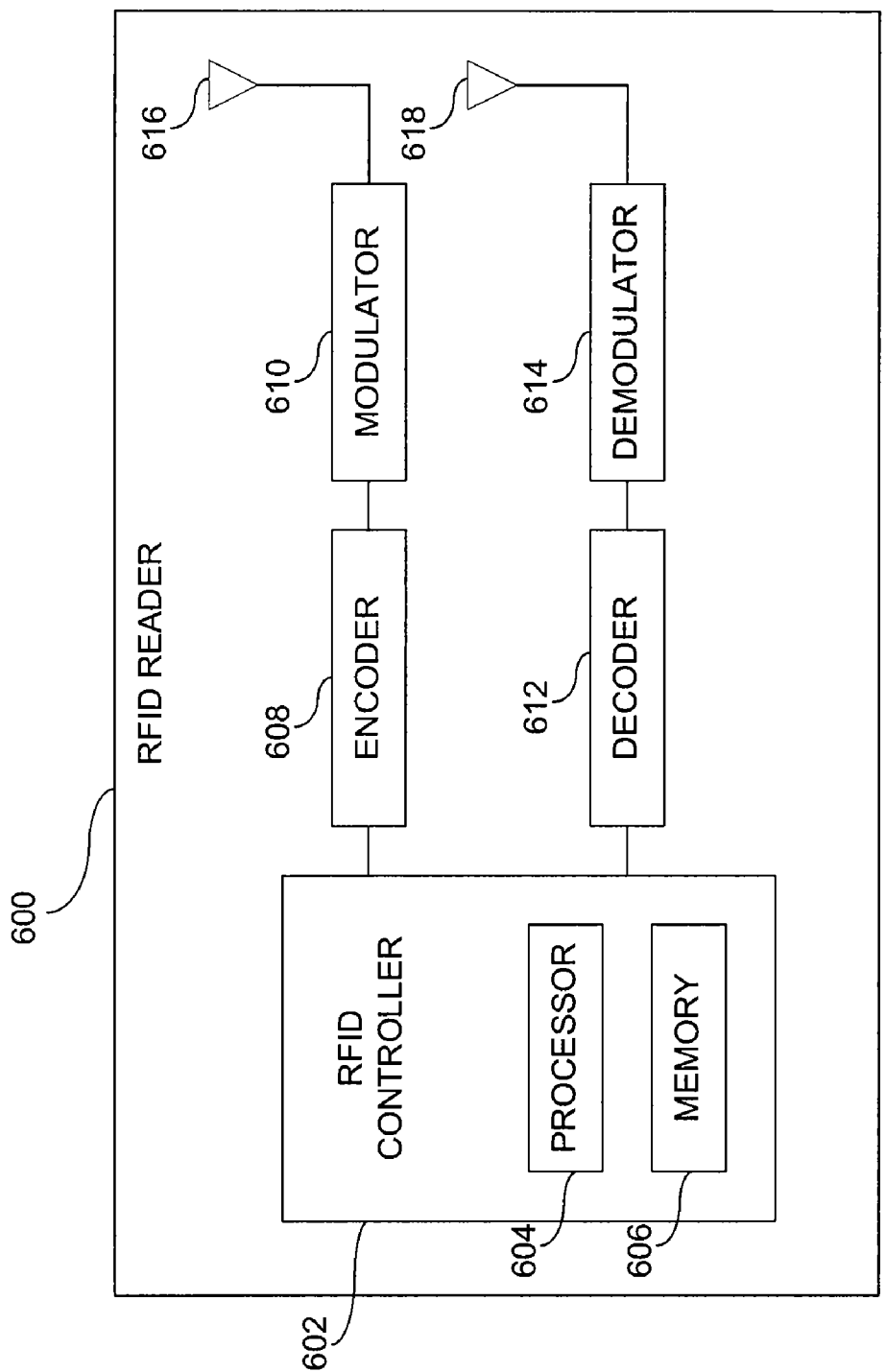
FIG. 6 is a block diagram of an example RFID reader, according to an embodiment of the invention.

FIG. 6 illustrates an example RFID reader 600 that may be used according to an embodiment of the invention. In this example, RFID reader 600 includes RFID controller 602, processor 604, memory 606, encoder 608, modulator 610, decoder 612, demodulator 614, transmission antenna(e) 616 and receive antenna(e) 618. Although not shown in FIG. 6, an RF front-end may also be included in reader 600. In an alternate embodiment antennas 616 and 618 are combined in one physical antenna utilizing a device called a ciculator to split transmit and receive signals is a common implementation.

If RFID reader 600 is operating in master mode, RFID controller 602 is configured to maintain a timer, select groups of frequencies, select frequencies from selected groups and issue frequency coordination commands to transmit to slave readers. In an embodiment, RFID reader 600 in master mode executes the steps of flowchart 400. In another embodiment, instead of being programmed with the groups of frequencies and the time period to be used, RFID reader 600 autonomously selects groups of frequencies within a range of frequencies and the time period for operating within a group of frequencies.

If RFID reader 600 is configured to operate in slave mode, RFID controller 602 is configured to process commands received from a master reader or controller such as synchronization signals, when to switch frequencies or groups of frequencies and the frequency or defined group of frequencies in which to operate. In an embodiment, RFID reader 600 in slave mode executes the steps of flowchart 500. In another embodiment, RFID reader 600 in slave mode receives and stores in memory 606 the time to switch frequencies and which frequency to switch to from a master reader or other time synchronization device, before the scheduled frequency changeover time. Receiving the time and frequency before the scheduled changeover allows for a simultaneous changeover in frequency for all slave readers.

RFID controller 602 issues commands and/or processes decoded receptions. Commands of RFID controller 602 are encoded by encoder 608, modulated by modulator 610 and transmitted by antenna 616. Radio frequency transmissions are received by antenna 618. The receptions are demodulated by demodulator 614 and decoded by decoder 612. In the current embodiment, RFID controller 602 includes a processor 604 and associated memory 606 in addition to any other circuitry required for an RFID reader (not shown). Processor 604 is used to execute instructions and may be a RISC processor, a microcontroller, a digital signal processor (DSP), or a similar instruction processing unit. Processor 604 may have an industry standard instruction set or a proprietary instruction set and may be used to run software or firmware to perform RFID reader functions according to an embodiment of the invention in addition to standard RFID reader functions. For example, processor 604 in conjunction with memory 606 may be used to perform the steps of the flowcharts 400 and 500.

Figure 7:
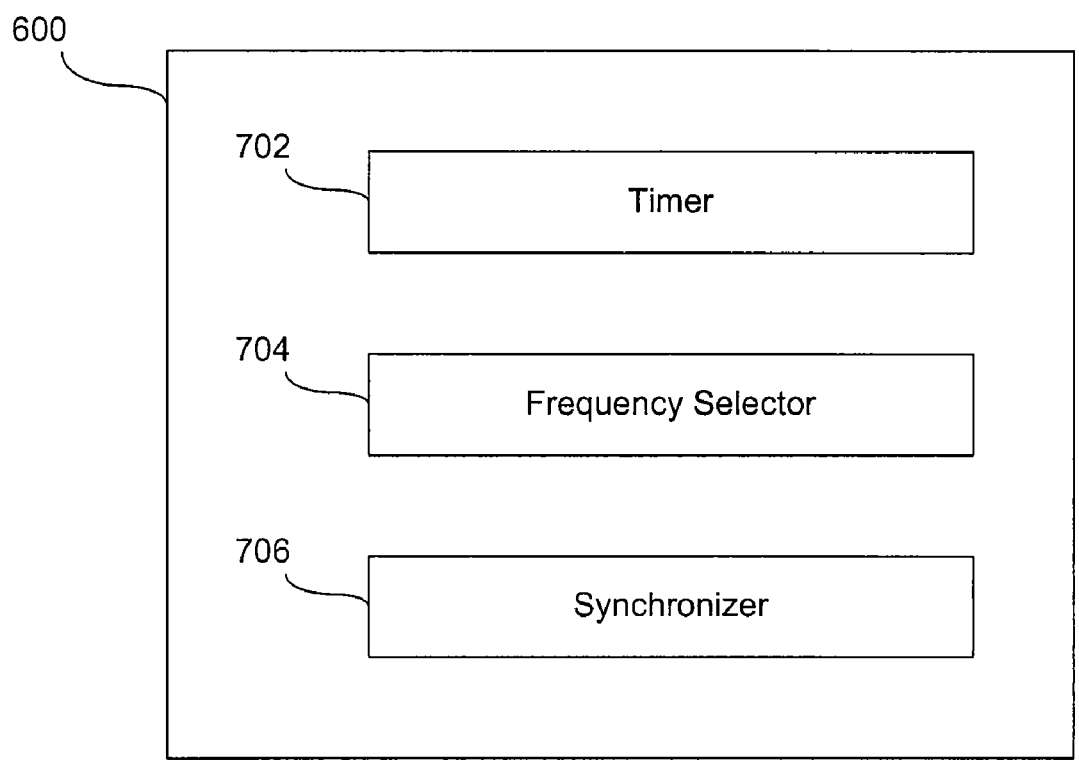
FIG. 7 is a block diagram of an example RFID controller, according to an embodiment of the invention.

FIG. 7 shows example modules for reader 600, according to an embodiment of the present invention. As shown in FIG. 7, reader 600 may include a timer 702, a frequency selector 704, and synchronizer 706. When reader 600 is operating in master mode, synchronizer 706 is used to synchronize with slave readers. It is also used to synchronize time using numerous existing time synchronization methods such as an atomic clock, web based time servers and existing wireless or network timing systems. In master mode, frequency selector 704 is used to select groups of frequencies and frequencies within a selected group to assign to slave readers. In master mode, timer 702 is configured to keep track of the time period during which a group selected by frequency selector 704 is being utilized.

When reader 600 is operating in slave mode, synchronizer 706 is used to synchronize with a master reader based on a synchronization signal received from the master reader. In one embodiment, slave reader 600 uses synchronizer 706 to synchronize an atomic clock, web based time servers and existing wireless or other network timing systems. In an embodiment, frequency selector 704 of slave reader 600 may be dormant. In another embodiment, a master reader determines a time to changeover frequencies and slave reader 600 receives a signal from the master reader indicating when to change frequencies. Upon receiving the signal from the master reader, slave reader 600 selects a group of frequencies and a frequency from the selected group using frequency selector 704. Using frequency selector 704, slave reader 600 may also coordinate with other slave readers so as not to select an interfering transmission frequency as that selected by another slave reader. In one embodiment, timer 702 of slave reader 600 is used to track the time period for which frequencies in a group are being utilized. In another embodiment, where slave reader 600 receives a signal from a master reader to changeover groups, timer 702 may be dormant.

Example manners in which timer 702, frequency selector 704, and synchronizer 706 perform their respective functions will be apparent to persons skilled in the relevant art(s). Modules 702, 704, and 706 may be implemented in hardware, software, firmware, or any combination thereof. In an embodiment, functionality of one or more of modules 702, 704, and 706 may be combined into a single module.

It should be understood that elements of the systems described herein can be implemented in hardware, firmware, software, or a combination thereof. For example, hardware, firmware, and/or software modules can perform one or more of the illustrated components of FIG. 6 (e.g. processor 604) and/or steps shown in flowcharts 400 and 500. For example, the hardware, firmware, software, or any combination thereof, may include algorithms for the control of reader 600.

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system. The invention, in an embodiment, is directed to such computer program products.

In an embodiment where aspects of the present invention are implemented using software, the software may be stored in a computer program product and loaded into a computer system using a removable storage drive, hard drive, or communications interface. The control logic (software), when executed by a processor, causes the processor to perform the functions of the invention as described herein.

According to an example embodiment, a computer executes computer-readable instructions to control one or more of a RFID reader functions.

Example Advantages

Conventional uncoordinated frequency utilization allows a random opportunity for multiple operational readers to interfere with each other's operation and thus their own and also overall system efficiency and effectiveness. Coordinated frequency utilization amongst RFID readers, as described herein, allows for efficient use of every available channel, also permits channel re-use, and greatly reduces or eliminates altogether reader interference and prevents a reader from reading tags incorrectly. Furthermore large system throughput gains improve in orders of magnitude upon coordinated frequency utilization. Increased throughput results in improved system reliability and effectiveness in a tag environment that is moving and dynamic. Thus another advantage of coordinating frequency utilization is a more reliable system. Embodiments of the invention as described herein, utilize a coordinated frequency utilization plan and a combination of subcarrier backscatter (allowing channel re-use) in RFID transmitters within a wide range of distance (spanning miles in some cases) to effect a substantial system throughput gain in performance. As RFID technology becomes ubiquitous, interference levels amongst RFID readers becomes more severe. Unresolved, poor system performance as a result of substantial interference and/or inability for proximate channel re-use could prevent an end user from purchasing the technology. Thus, embodiments described herein help mitigate these problems.

The sphere of influence of an RFID reader decreases when ensuring frequency separation of transmitters and receivers as can be accomplished very effectively while using subcarrier tag backscatter. For example, a sphere of influence of a reader is determined by the power from a first reader's transmitter being received in the receiver band of any another potential reader while attempting to communicate with tags at a maximal distance of operation from that reader. In conventional systems, readers operating on adjacent frequencies with overlapping backscatter frequencies may be transmitting at 30 dBm (decibels below 1 milliwatt), at the frequency of the intended backscatter, at a sensitivity of around −60 dBm, thereby creating 90 dBm attenuation. The sphere of influence is determined by the distance needed to attenuate +30 to −60 dBm, which is likely to be miles, depending upon materials in line of sight. If there is sufficient separation between adjacent frequencies of operation, as is provided by embodiments presented herein, it is likely that the power in the receiver frequency will already be reduced by 30 dBm, as a result of containing transmitter modulation in channel. Thus, only 60 dBm of attenuation (as opposed to 90 dBm as in conventional RFID systems) is needed resulting in a substantially shorter sphere of influence, possibly in the hundreds of feet. More limitations of frequencies of potential interference serves to even further reduce a sphere of influence—potentially into just a few feet.

A subcarrier backscatter method of encoding is preferred to allow channel re-use without multiple reader modulator coordination at a minimal range. In the preceding case, with 90 dBm of attenuation, the sphere of influence in distance is very large (possibly miles) before another reader can be active on that channel for receiving signals due to the disparate power nature of a reader transmitting at +30 dBm, and receiving at −60 dBm at the same frequency, for example. However, moving the lower power response of tag backscatter to a frequency outside the channel facilitates re-use of that same channel in a much shorter range. An adjacent channel's power is likely to be 30 dBm attenuated in power at the point of transmission. The sphere of influence is reduced by the distance the extra 30 to 50 dBm would have made. The sphere of influence is further reduced by the frequency separation of subcarrier systems. In fact, it is possible to effectively operate all readers active on only one channel if the backscatter receive frequencies are selected to be far from the transmit frequencies.

In this method, short range, mid range, and even long range network latency will not severely effect interference over a long time period. This interference could be caused by uncoordinated periods due to latency issues between controller, shortest latency and longest latency devices. Time coordination can easily be on the order of tens or hundreds of milliseconds, which can be transported through any size network (wired and/or wireless). As stated earlier, time coordination can also be done via imbedded or discrete transmissions sent via the RF interface originally intended for communication with RFID tags. In this embodiment, "off network" devices such as RFID readers in two corporate networks protected by firewalls or otherwise un-routable networks can coordinate usage plans and time synchronization.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method to assign frequencies to radio frequency identification (RFID) readers for interrogating a population of tags, comprising:
   determining a plurality of groups of frequencies from a range of frequencies;
   selecting a first group of frequencies from the plurality of groups of frequencies;
   selecting a time period during which the selected first group of frequencies is used;
   selecting a second group of frequencies from the plurality of groups of frequencies at the end of the time period; and
   selecting a time period during which the selected second group of frequencies is used;
   wherein substantially all frequencies of the selected first and second groups of frequencies are assigned during a predetermined time duration;
   wherein frequencies in the first group and the second group are mutually exclusive; and
   wherein adjacent frequencies within a group are selected such that readers within an interference range and operating on adjacent frequencies experience substantially reduced interference.

2. The method of claim 1, wherein a master reader selects the plurality of groups of frequencies.

3. The method of claim 1, wherein a master reader assigns a frequency to each RFID reader.

4. The method of claim 1, wherein a master reader selects the time period during which a selected group of frequencies is used.

5. The method of claim 2, wherein a master reader determines the duration of the time period by synchronizing with an atomic clock.

6. The method of claim 1, wherein separation between consecutive frequencies in each group of the groups of frequencies are based on backscatter sub-carrier frequency of tags.

7. The method of claim 1, wherein a master reader determines the first and second groups of frequencies from a range of frequencies.

8. The method of claim 1, wherein the first and second groups of frequencies and the first and second time periods are pre-programmed into each reader.

9. The method of claim 1, wherein a reader is programmed to synchronize with one or more of a master reader and an atomic clock.

10. The method of claim 9, wherein a reader is programmed to cease operation in absence of a master reader or an atomic clock for synchronization.

11. The method of claim 1, wherein a master reader coordinates selection of groups of frequencies and time periods by broadcasting a RFID signal.

12. The method of claim 1, wherein selection of groups of frequencies and time periods is broadcast via a wired or wireless Local Area Network (LAN).

13. A master radio frequency identification (RFID) reader device, comprising:
   RFID controller; a transceiver coupled to the RFID controller; and
   at least one RF antenna coupled to the transceiver;
   wherein the RF antenna transmits commands received from the RFID controller via the transceiver to slave RFID readers; wherein the RFID controller is configured to select a first group of frequencies from a plurality of groups of frequencies, select a time period during which the selected group of frequencies is used, assign a frequency from the first group of frequencies to each slave RFID reader to use during the time period, select a second group of frequencies from the plurality of groups of frequencies at the end of the time period, and assign a frequency from the second group of frequencies to each slave RFID reader;
   wherein substantially all frequencies of the groups of frequencies are assigned during a predetermined time duration;
   wherein frequencies in the first group and the second group are mutually exclusive; and
   wherein adjacent frequencies within a group are selected such that readers within an interference range and operating on adjacent frequencies experience substantially negligible interference.

14. An RFID system comprising:
   a first reader transmitting at a first frequency from a first group of frequencies during a predetermined time period;
   a second reader transmitting at a second frequency from the first group of frequencies during the predetermined time period;
   wherein substantially all frequencies of the first group of frequencies and a second group of frequencies are assigned during a predetermined time duration;
   wherein frequencies in the first group are mutually exclusive from frequencies in the second group; and
   wherein readers within an interference range, operating on adjacent frequencies within the first group, experience substantially negligible interference.

15. The system of claim 14, wherein the first reader is a master reader and the second reader is a slave reader.

16. The system of claim 15, wherein the first reader determines and assigns the first and second frequencies from the first group of frequencies.

17. The system of claim 15, wherein the first reader, at the end of the predetermined time period, transmits on a third frequency and commands the second reader to transmit on a fourth frequency, wherein the third and fourth frequencies are from a second group of frequencies.

18. The system of claim 14, wherein the first reader is a slave reader and the second reader is a slave reader.

19. The system of claim 18, wherein the first reader and the second reader receive commands from a master reader.

20. The system of claim 19, wherein the master reader determines the first group, the first frequency and the second frequency.

21. An RFID system comprising:
   a first reader transmitting at a first frequency from a first group of frequencies during a first time period;

the first reader transmitting at a second frequency from a second group of frequencies at the end of the first time period;

wherein frequencies in the first group and the second group are mutually exclusive; and wherein adjacent frequencies within a group are selected such that readers within an interference range and operating on adjacent frequencies experience substantially negligible interference.

22. The system of claim 21, wherein the first reader is a slave reader that is configured to receive commands from a master reader that selects and assigns the first frequency and the second frequency.

23. The system of claim 22, wherein the master reader selects the first group of frequencies and the second group of frequencies.

24. The system of claim 22, wherein the master reader determines the time period and the predetermined time duration.

25. The system of claim 22, wherein the master reader commands the first reader to transition from the first frequency in the first group to the second frequency in the second group.

* * * * *